Sept. 24, 1963

B. A. PEARSON ETAL 3,104,862

DISCHARGE VALVE MECHANISM

Filed June 23, 1959

INVENTORS
BERNARD A. PEARSON
D. L. SNELLMAN

BY *Barnet & Seed*

ATTORNEYS

Sept. 24, 1963  B. A. PEARSON ETAL  3,104,862
DISCHARGE VALVE MECHANISM
Filed June 23, 1959  4 Sheets-Sheet 2

INVENTORS
BERNARD A. PEARSON
D. L. SNELLMAN
BY
ATTORNEYS

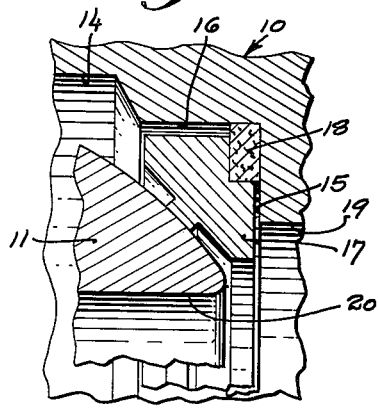
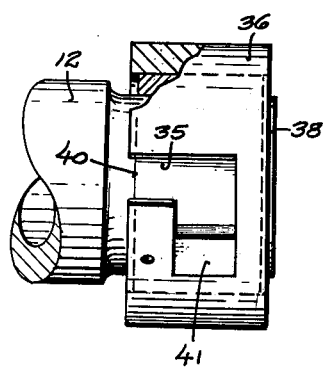
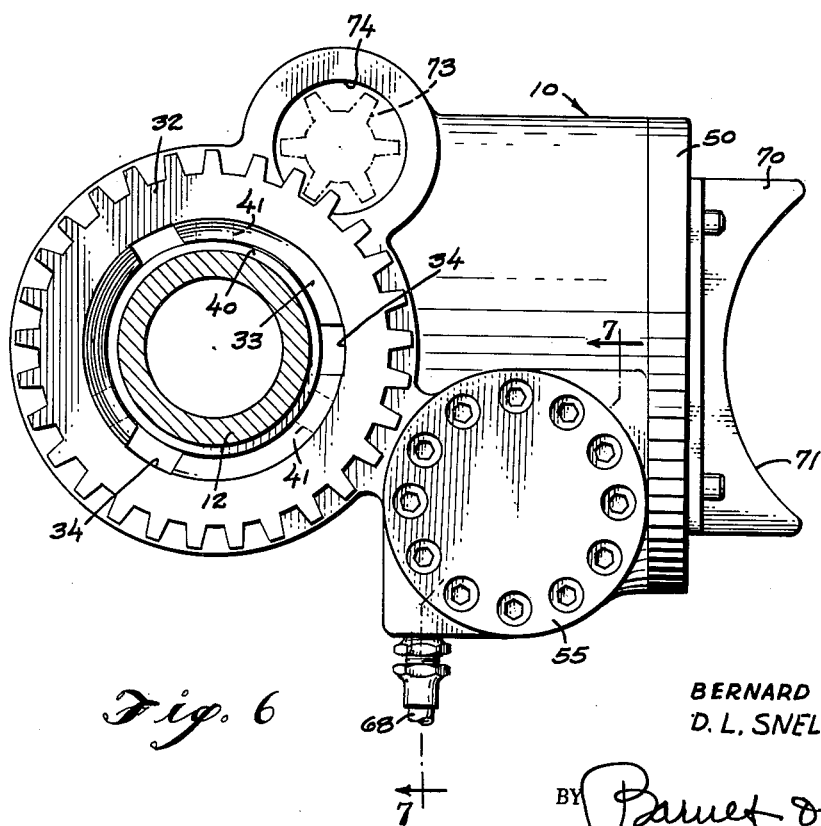

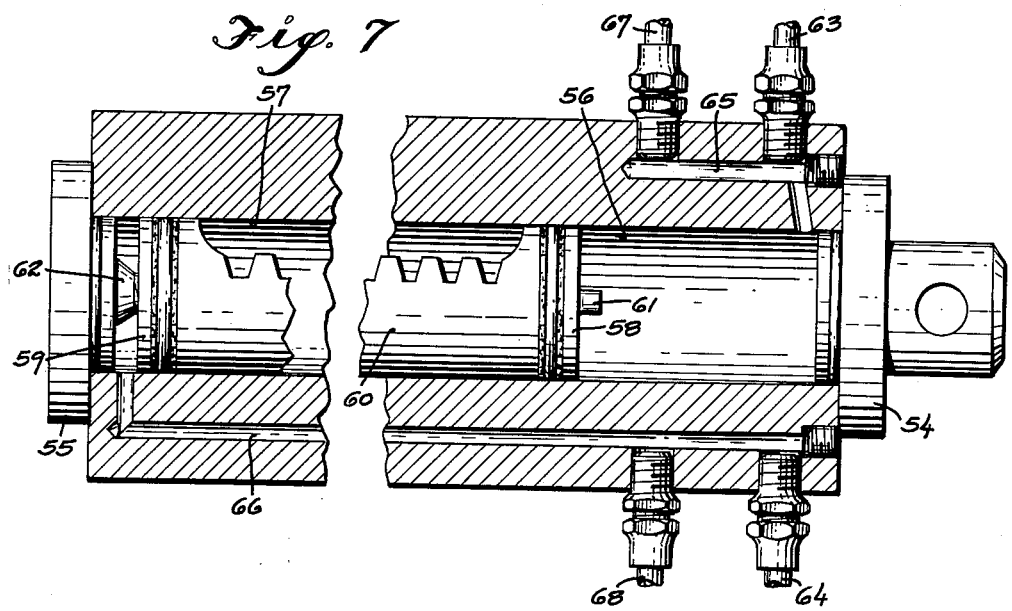
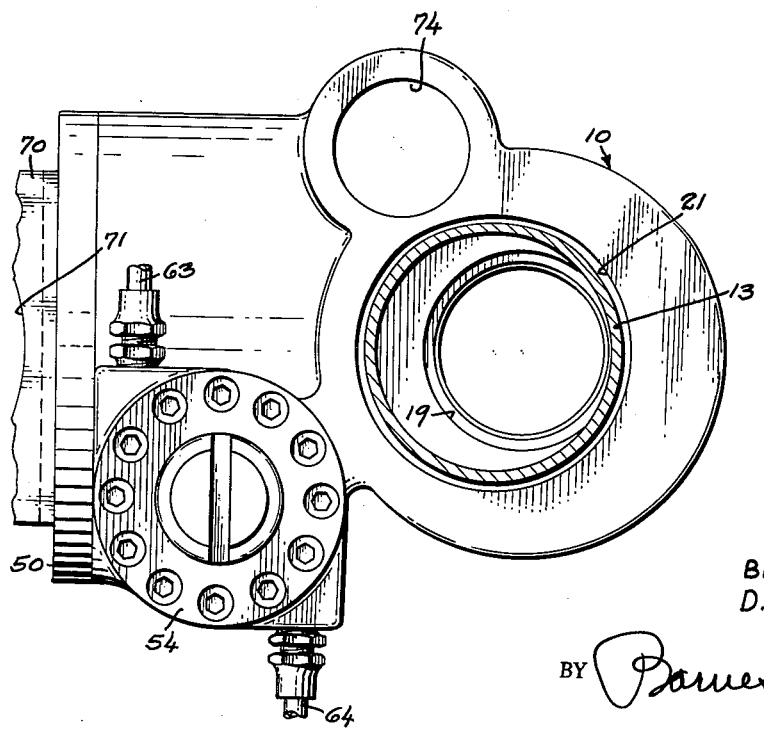

United States Patent Office 3,104,862
Patented Sept. 24, 1963

3,104,862
DISCHARGE VALVE MECHANISM
Bernard A. Pearson, 525 E. 94th, and Donald L. Snellman, 325 Fulton St., both of Seattle, Wash.
Filed June 23, 1959, Ser. No. 1,822
15 Claims. (Cl. 251—58)

This invention relates to discharge valve mechanism, and particularly discharge valve mechanism capable of passing solid objects and which can be operated by remote means. The invention is especially designed with a view toward converting plutonium production reactors from batch to continuous process, and it is believed that clarity in an understanding of the invention will be advanced by referring to this particular usage, bearing in mind, however, that the invention is in no sense limited thereto. It will be understood, therefore, that any reference in the description and claims to plutonium production reactors and the process tubes and slug-like fuel elements employed therein shall be construed broadly to mean any field of usage to which the invention lends itself.

Considered, therefore, in relation to reactors used in the production of plutonium, the invention has for its general object the provision of a valve which will permit any specific process tube or tubes or all of the tubes of an atomic reaction system to be discharged at will, by remote means, in an exceedingly short period of elapsed time, and in a manner such that the discharge may take place, if desired, while the tube is in the process of being recharged with new fuel elements. The ability to discharge at random safeguards the system against extensive loss of process tubes and perforce minimizes the shut-downs which, in a conventional batch-type plant, occur either from a need for discharging fuel elements or by reason of a need for servicing. A continuous-operation plant has the added advantage of prolonging the life of the reactor and its components for the same reason that any heat generator suffers from a shut-down namely destructive stressing of the components as cooling and reheating causes contraction and expansion.

Other more particular objects of the invention are to provide a discharge valve and actuator assembly in which the valve proper is extremely compact in relation to the over-all size of the assembly; one which may be securely attached to and removed from the discharged nozzle of a concerned process tube with ease and expedition; one which admits of having its outer surface constructed of a corrosion-resistant material, and which presents an exterior configuration which is easy to clean; one which employs hydraulic fluid as its actuating medium and has the connections therefor so located that the same will be in a readily accessible position after the assembly has been installed on the reactor; one providing a straight and unobstructed flow pattern for a discharged fuel element and which positively precludes an element from hanging up as it traverses the path of discharge; one which provides substantially a leak-proof closure in the "off" position and a full flow when open and incorporates a calibration adjustment to insure said full opening; one which may be exposed to moderate pressure, temperature, and corrosion conditions for long periods of time without freezing; one which will be capable of functioning with minimum leakage through the actuator for the valve even in the event of a complete deterioration of hydraulic seals employed in the assembly; one which is capable of withstanding high levels of atomic radiation without creating a malfunctioning of the unit; one in which means for transmitting valve-moving motions from an actuator proper to the valve proper will withstand the total static test pressure of the hydraulic source in the event that leakage should occur past seals which normally isolate said transmitting means from the hydraulic source; and one which admits of having a curved pipe easily attached to its downstream end so that the discharge from the valve may be deflected at approximate right angles to the valve's line of flow.

With the above objects and advantages in view, and which will each appear and be understood in the course of the following description and claims, the invention consists in the novel construction and in the adaptation and combination of parts hereinafter described and claimed.

In the accompanying drawings:

FIG. 4 is a fragmentary horizontal sectional view detailing the ball-seat structure encircled by dash-and-dot lines in FIG. 1.

FIG. 5 is a fragmentary elevational view detailing a part of the coupling mechanism by which the valve body is attached to the discharge nozzle of the process tube of a plutonium reactor.

FIG. 6 is a transverse vertical sectional view on line 6—6 of FIG. 1, employing the same scale as that of FIGS. 2, 3 and 5.

FIG. 7 is a fragmentary longitudinal vertical sectional view on line 7—7 of FIG. 6; and FIG. 8 is a fragmentary rear elevational view of the discharge valve with the tail pipe shown in section.

Figure 1:
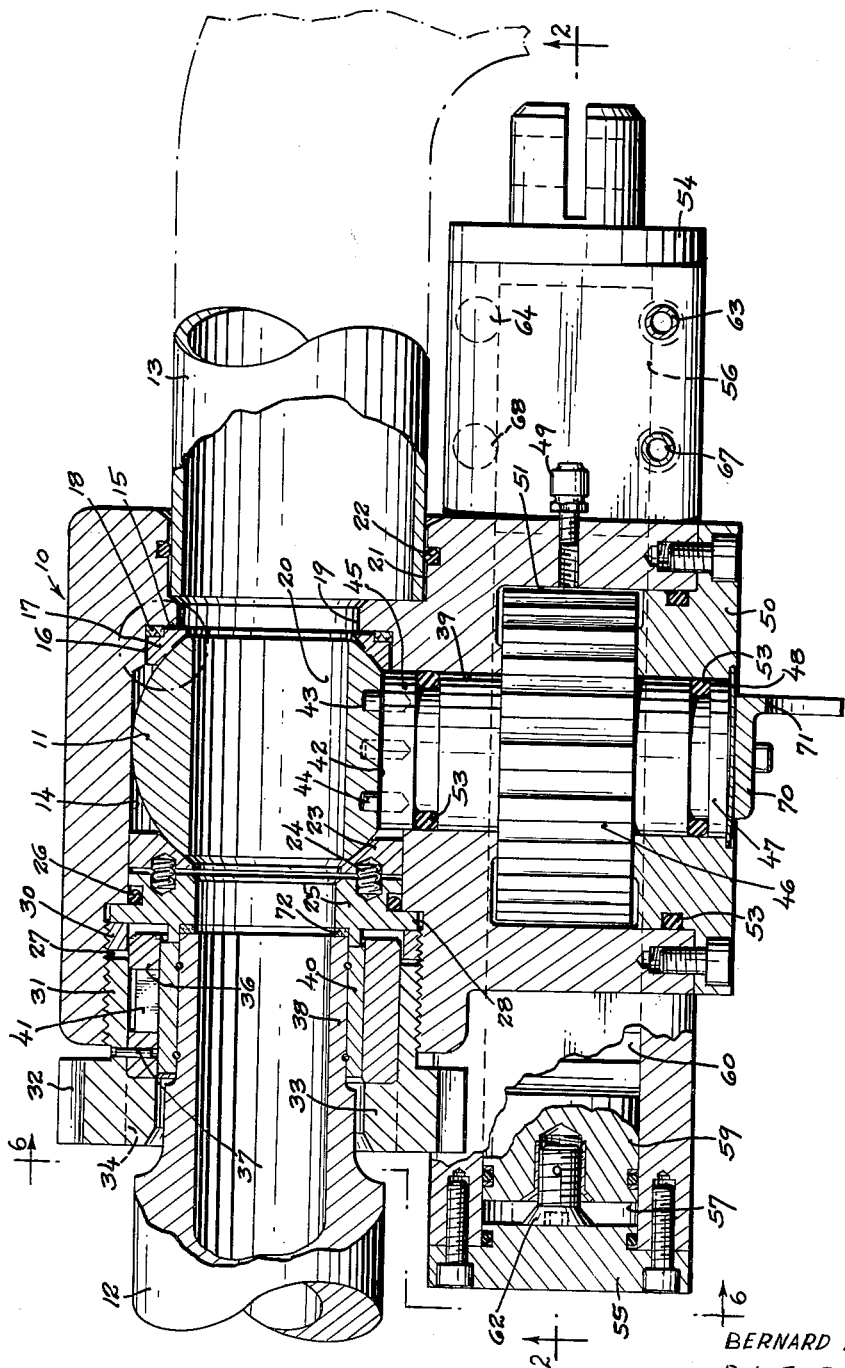
FIGURE 1 is a horizontal sectional view illustrating a discharge valve constructed to embody the preferred teachings of the present invention, and incorporating a fragmentary showing of head and tail pipes leading to and from the valve body.
Figure 2:
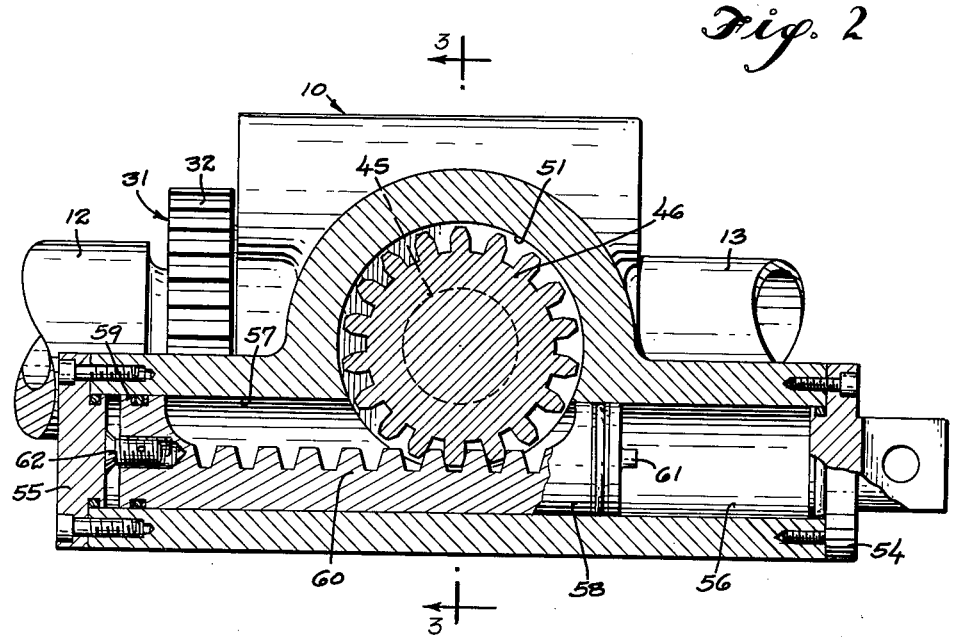
FIG. 2 is a longitudinal vertical sectional view thereof drawn to a reduced scale on line 2—2 of FIG. 1.

Referring to said drawings, the numeral 10 designates a housing which is cast as a single piece to accommodate both the valve proper of the present invention and mechanism for the actuation thereof. Through-openings of circular cross-section are provided extending end to end of the housing in both the valve side and the actuator side of the housing. The through-opening in said valve side accommodates a center-bored ball valve 11 together with head and tail pipes 12 and 13, respectively, at the opposite sides thereof. The chamber 14 in which the ball valve is received has a thrust shoulder 15 at its front end and is necked down, as at 16, immediately adjacent this shoulder. A bronze seating ring 17 is received in the necked-down portion of said chamber 14 and bears against a gasket 18, preferably cranite. As can be best seen from an inspection of FIG. 4 the ball seat provided by said ring is comparatively narrow to insure a tight seat throughout the perimeter. The neck 19 which produces said thrust shoulder 15 has an inside diameter moderately larger than the bore 20 of the ball valve 11. The neck 19 leads to a tail socket 21 in which the tail pipe 13 is received. An O-ring 22 seals said pipe. The usual installation in the character of reactor system for which the valve of the present invention is especially designed dictates that the discharge be made at approximately right angles to the line of flow through the valve. We have represented in FIG. 1 a pipe of this elbowed configuration. In order that cylindrical slugs discharged through the valve will negotiate such 90° turn with ease, a bearing lightly by both the fore and aft edge on that portion of the tail pipe's inner wall which produces the outside bend of its elbowed shape, and so that there will be no tendency to become cocked in its traversal of the bend, the pipe 13 has an inside diameter considerably larger than the bore of the valve and the inlet end of such tail pipe is axially offset from the valve, locating a prolongation of the valve axis considerably closer to the outside than to the inside of the 90° bend.

A thrust ring 23 is yieldingly urged to bear against the front end of the ball valve by a set of circumferentially spaced apart compression springs 24. 25 denotes a ring-shaped flanged carrier for these springs. Both the thrust ring and a nose portion of the spring carrier are given a sliding fit in the cylindrical chamber 14. Said nose is sealed by an O-ring 26.

An internally threaded chamber 27 having a diameter increased from that of the valve chamber 14 is provided at the inlet end of the casting. The flange 28 of the carrier 25 bears against the shoulder which separates these chambers and is fixed in place by a lock nut 30. A retainer 31 for the inlet pipe 12 also threads into the chamber 27. The outer end of this retainer is exposed and there is presented upon said exposed end an external spur gear 32 and an internal flange 33. Longitudinal slots 34 are provided in said internal flange at equidistantly spaced intervals of the circumference. The slots 34 correspond to the entrance slots 35 (see FIG. 5) of bayonet sockets provided by a bearing sleeve 36 over which the retainer fits and to which it is releasably attached by a shear pin 37.

The retainer 31 performs the function of an adapter enabling the nozzle end 38 of the head pipe 12 to be coupled to the valve housing. The nozzle has a collar 40 thereon which carries lug complements 41 of the described bayonet sockets.

It is to be here noted that the spring carrier 25 has an internal diameter larger than the nozzle 38 and that the internal diameters of the thrust ring 23, the ball valve 11, and the tail pipe 13 are each progressively larger in turn. This insures a fuel element from hanging up as the same is ejected through the bores of the named elements upon an opening of the valve.

Figure 3:
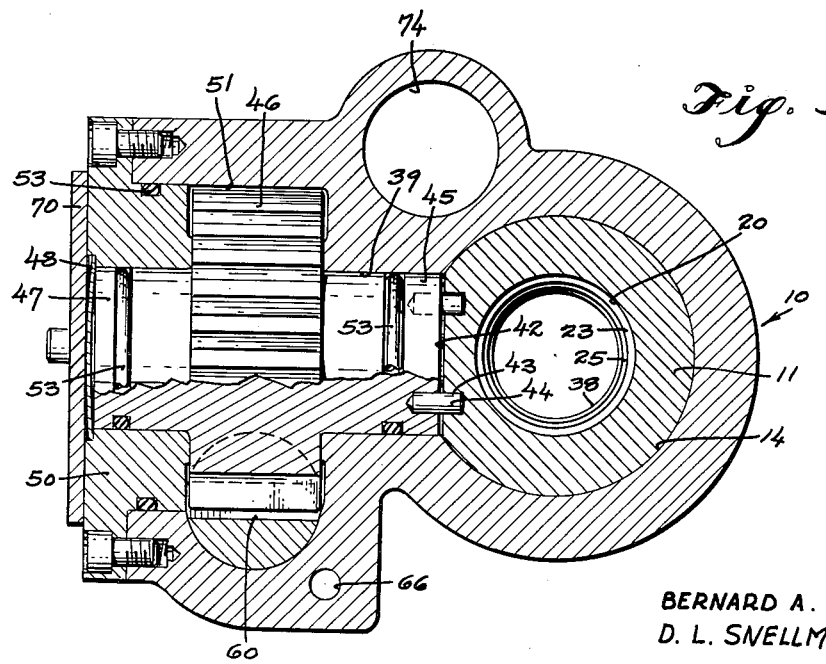
FIG. 3 is a transverse vertical sectional view on line 3—3 of FIG. 2.

Reverting to the ball valve, it will be seen from an inspection of FIGS. 1 and 3 that one side thereof provides a flat face 42 lying in a plane at right angles to a perpendicular projected from the axial line of the valve's center-bore 20. This face has a ring of equidistantly spaced sockets 43 formed therein and mating with these sockets are studs 44 fixed to and protruding from the end trunnion 45 projecting from one side of a gear wheel 46. The trunnion 45 and a companion trunnion 47 are journaled for rotation one in a cross-passage 39 provided in the housing and the other in a removable member 50 which closes a chamber 51 in which the gear wheel 46 is received. The gear wheel occupies a position tangent to the through-opening which is provided in the actuator side of the housing. Both trunnions and the closure member 50 are grooved to receive a respective sealing O-ring 53. The closure member has a center opening closed by a snap-fit cover plate 48. 49 denotes a relief valve leading from the chamber occupied by the gear wheel.

The last named through-opening is closed at each end by a removable header, as 54 and 55, providing between such headers and the chamber 51 a respective cylinder, as 56 and 57. Pistons 58 and 59 for these cylinders are formed one upon one end and the other upon the other end of a rack 60 meshing the gear wheel 46. A fixed stop 61 and an adjustable stop 62 are provided upon the two ends of the rack-and-piston member.

Pressure fluid for the activation of said rack-and-piston member, so as responsively to move the ball valve through a 90° turn either to the open position in which it is shown or to a closed position whereat the axis of the bore lies at substantial right angles to the axis of the nozzle, is delivered by pipes 63 and 64 from a source of supply (not shown) to passages 65 and 66 bored in the housing and leading one to the extreme outer end of the cylinder 56 and the other to the extreme outer end of the cylinder 57. Oil-return pipes 67 and 68 extend from said passages to a reservoir from which the pressure source draws its supply. It will be understood that control valves (not shown) for the system are so interconnected that upon supplying oil under pressure to either cylinder, selectively, the oil-return pipe for the other cylinder becomes simultaneously open to the reservoir while the other two pipes are each closed.

It will be seen that an angle-plate 70, presenting a saddle opening 71, is boltably secured to the closure member 50. The re-entrant curve on which said saddle opening is developed is in mating correspondence with an arcuate profile configuration given to the opposite side of the housing, the purpose being to enable the housings to be fitted one against another as they are attached each to a respective one of the multiple equidistantly spaced apart ejection nozzles of the reactor system, these nozzles occurring side-by-side in a plurality of levels.

When installing a valve housing upon the nozzle of a concerned head pipe 12, the shear pin 37 so positions the retainer 31 and the bearing sleeve 36 that slots 34 and 35 are in registration, thus permitting lugs 41 of the nozzle to be introduced to the bayonet socket. Retainer 31 will at this time have been only partially threaded into the chamber 27, and the procedure is now one of twisting the retainer to shear the pin which permits such further threading of the retainer as will bring the nozzle to bear against and compress a sealing cranite gasket 72. When for any reason a fuel element or elements within a process tube goes bad or a "scram" condition, which is an emergency situation, arises so that the elements contained in a concerned tube or tubes, or in all tubes, must be discharged the remote controls permit any given hydraulic line or lines to be opened at will with an instant response by the concerned ball valve as the shuttle rack 60 acts through the gear wheel 46 to move such valve to a precision-set open position. A closing of the valve is likewise instantly accomplished so that a process tube can, if desired, be recharged with fresh fuel elements simultaneously with the discharge of the previously contained elements. Should it be desired to remove a valve housing the procedure is to turn the retainer so as to bring slots 34 and 35 into registration, whereupon a shear pin can be introduced to lock the retainer to bearing sleeve 36 and the two can be then turned in unison to free lugs 41 from the bayonet sockets. The housing is then slipped off the nozzle, being backed out of the space between two adjacent separated valve housings.

The operation of twisting the retainer so as to shear the pin is performed by a powered spindle carrying a pinion 73 (see FIG. 6) which meshes the teeth of gear 32. The housing presents a through-opening 74 serving as a journal for the spindle and into which the spindle is inserted when a valve housing is to be mounted on a nozzle.

The fit of the studs 44 in the sockets 43 is such that the ball valve is full-floating, so to speak, and thus allows the valve to bear firmly upon its seat throughout the full perimeter. The fact that the studs and their mating sockets, preferably six in number, are spaced equidistantly within a circle taken about the axis of the trunnion 45 as a center is of import in that it distributes the torque passed from the trunnion to the valve as the latter is turned between open and closed positions.

It is believed that the invention, manner of its operation, and several advantages, will have been clearly understood from the foregoing detailed description of our now-preferred illustrated embodiment. Changes in the details of construction may be resorted to without departing from the spirit of the invention and it is accordingly our intention that no limitations be implied and that the hereto annexed claims be given the broadest interpretation to which the employed language fairly admits.

What I claim is:

1. An ejection valve for the described purpose comprising a valve body having openings extending longitudinally thereof in spaced parallelism with one being a through-opening serving as an ejection passage and the other serving as an activator bore, the body having a cylindrical cross-passage located normal to the axis of the ejection passage and extending between said passage and a gear chamber lying tangent to the activator bore in a position intermediate the ends thereof, a gear wheel received in said gear chamber and carried by a spindle journaled for rotation in said cross-passage, a rack meshing the gear wheel and upon each of its two ends presenting a piston received for endwise sliding motion in a respective one of two closed cylinders formed by the ends of said activator bore, a center-bored ball valve received in said ejection passage and so coupled to the spindle of the gear wheel that the valve turns in unison with the gear wheel about a center which is normal to the valve's center-bore, a spring-pressed thrust-ring bearing upon the valve to urge the valve against a downstream valve seat, and controlled connections between the two said cylinders and a remote source of hydraulic pressure for driving the rack in either direction, selectively, to responsively open or close said ball-valve, said valve body, considered in end elevation, being convex at one side and concave at the other side with the one being a reverse counterpart of the other so placed that a plurality of said valve bodies can be snugly fitted one against another in a row and thus derive lateral localizing support each said valve body from a next adjacent valve body in the row.

2. An ejection valve for the described purpose comprising a valve body having openings extending longitudinally thereof in spaced parallelism with one being a through-opening serving as an ejection passage and the other serving as an activator bore, the body having a cylindrical cross-passage located normal to the axis of the ejection passage and extending between said passage and a gear chamber lying tangent to the activator bore in a position intermediate the ends thereof, the end of said gear chamber opposite the cross-passage being open to the atmosphere, a closure for said open end presenting a cylindrical bore co-axial with the cross-passage, a gear wheel received in said gear chamber presenting trunnion ends journaled one in said cylindrical bore and the other in said cross-passage, a rack meshing the gear wheel and upon each of its two ends presenting a piston received for endwise sliding motion in a respective one of two closed cylinders formed by the ends of said activator bore, a center-bored ball valve received in said ejection passage and so coupled to the trunnion which is journaled in said cross-passage that the valve turns in unison with the gear wheel about a center which is normal to the valve's center-bore, a spring-pressed thrust-ring bearing upon the valve to urge the valve against a downstream valve seat, said seat for the valve comprising a bronze ring bearing against a shoulder formed in the ejection passage at the downstream end thereof, said ring having an inside diameter larger than the inside diameter of the ball valve and said shoulder in turn having an inside diameter larger than that of the ring.

3. A valve according to claim 2, and an elbowed tail pipe formed with an inside diameter considerably larger than the inside diameter of the neck and having its head end slip-fitted within a socket provided by the valve body immediately adjacent said neck, the socket being so laterally offset from the axial line of the ejection passage that a prolongation of the pipe's inner wall projected from the outside bend of the elbow lies approximately flush with an inside edge of the neck.

4. Structure according to claim 3 in which the wall of the tail socket is circumferentially grooved and has an O-ring seal fitted in said groove.

5. An ejection valve for the described purpose comprising a one-piece valve body having openings extending longitudinally thereof in spaced parallelism with one being a through-opening serving as an ejection passage and the other serving as an activator bore, said ejection passage being of cylindrical form providing an internally threaded socket at its upstream end separated by a rearwardly facing shoulder from a smooth-faced co-axial valve chamber at the downstream end, a cylindrical cross-passage located normal to the axis of said ejection passage and extending between the valve chamber and a gear chamber lying tangent to the activator bore in a position intermediate the ends thereof, a gear wheel received in said gear chamber and carried for rotation by an integral spindle journaled in said cross-passage, a rack meshing the gear wheel and upon each of its two ends presenting a piston working in a respective one of two closed cylinders formed in the ends of said activator bore, a center-bored ball valve received in said valve chamber and so coupled to the spindle that the valve turns in unison with the gear wheel about a center which is normal to the valve's center-bore, a spring-pressed thrust ring bearing upon the valve to urge the valve against a valve seat provided in the valve chamber at the downstream side of the valve, a carrier for the springs of said thrust ring providing a nose portion fitting the wall of the valve chamber and having a flange bearing against said rearwardly facing shoulder, a lock nut threaded in said upstream socket to engage the flange, means also threaded in said upstream socket for releasably coupling the valve body to the discharge nozzle of a head pipe, and controlled connections between the two said cylinders and a remote source of hydraulic pressure for driving the rack in either direction, selectively, to responsively open or close the valve.

6. The valve recited in claim 5 characterized in that the profile configuration of the body, when viewed from an end, is convex at one side and concave at the other side with the two being reverse counterparts of one another so that a plurality of said valve bodies can be snugly fitted one against another in a co-planar row.

7. A valve according to claim 5 in which the recited coupling means comprises a bearing sleeve presenting bayonet sockets accommodating lug counterparts thereof carried by the nozzle, and a retainer member into which said collar is fitted, the retainer member being externally threaded to work in the internal threads of the socket and being releasably connected to the sleeve by a shear pin.

8. Structure as recited in claim 7 characterized in that the retainer member presents an exposed externally toothed portion arranged to be turned by a meshing pinion for shearing the pin, the valve body providing a bore serving as the journal mounting for a drive spindle on which said pinion is carried.

9. Structure as recited in claim 7 in which the outer end of the retainer member presents an internal flange against which the sleeve bears, and having circumferentially spaced longitudinal slots therein arranged to be brought into registration with the entry throats of the bayonet sockets by rotating the member relative to the sleeve.

10. The valve structure recited in claim 5 having a cranite gasket compressed between the spring carrier and the nozzle by the act of threading the coupling means into the socket, and providing an O-ring seal upon the nose portion of said spring carrier.

11. An ejection valve for the described purpose housed within a valve body having bolted to one side thereof an adapter plate whose profile configuration, as viewed from an end of the body, is a concave reverse counter-part of a convex profile configuration characterizing the opposite side of the body so that a plurality of said valve bodies can be snugly fitted one against another in a co-planar row and thus obtain lateral localizing support each said valve from a next adjacent valve in the row resisting displacement in a direction at cross-angles to said plane of the row.

12. An ejection valve for the described purpose housed within a valve body whose profile configuration at one side, as viewed from an end of the body, is a concave reverse counterpart of a convex profile configuration characterizing the opposite side of the body so that a plurality of said valve bodies can be snugly fitted one against another in a co-planar row, a coupling being provided by the valve body for drawing the body bodily in an endwise direction onto a respective one of a plurality of in-line parallel ejection nozzles spaced one from another in correspondence with the span between said concave and convex bearing sides of the valve body.

13. An ejection valve for the described purpose comprising a valve body having a through-opening serving as an ejection passage, said ejection passage being of cylindrical form providing a smooth-faced valve chamber intermediate the length separated by rearwardly facing shoulders from a reduced co-axial discharge neck at the downstream end and from an enlarged co-axial socket at the upstream end, said socket being internally threaded, a center-bored ball valve received in said valve chamber, a spring-pressed thrust ring bearing upon the valve to urge the valve against a removable valve seat bearing against the downstream shoulder, a carrier for the springs of said thrust ring providing a nose portion fitting the wall of the valve chamber and having a flange bearing against said upstream shoulder, means threaded in said socket for releasably coupling the valve body to the discharge nozzle of a head pipe, said coupling being so designed as to draw the valve bodily in an endwise direction and responsively impose compression pressure upon a gasket interposed between said nozzle and the spring carrier, a seal surrounding said nose portion of the spring carrier, and means for turning said ball valve between open and closed positions about a center which is normal to the valve's center-bore, said nozzle, the spring carrier and its associated thrust ring, the ball valve, and the discharge neck each having a successively larger internal diameter.

14. Structure according to claim 13, and a tail pipe removably fitted within a socket provided by the valve body at the downstream end of the ejection passage immediately adjacent said neck, the inside wall of the socketed tail pipe, throughout its perimeter, being spaced radially beyond an axial prolongation of the valve's center-bore, said tail pipe being surrounded within the socket by an O-ring seal.

15. An ejection valve for the described purpose comprising a valve body having openings extending longitudinally thereof in spaced parallelism with one being a through-opening serving as an ejection passage and the other serving as an activator bore, the body having a cylindrical cross-passage located normal to the axis of the ejection passage and extending between said passage and a gear chamber lying tangent to the activator bore in a position intermediate the ends thereof, a gear wheel received in said gear chamber and carried by a spindle journaled for rotation in said cross-passage, a rack meshing the gear wheel and upon each of its two ends presenting a piston received for endwise sliding motion in a respective one of two closed cylinders formed by the ends of said activator bore, a center-bored ball valve received in said ejection passage and so coupled to the spindle of the gear wheel that the valve turns in unison with the gear wheel about a center which is normal to the valve's center-bore, a spring-pressed thrust-ring bearing upon the valve to urge the valve against a downstream valve seat, and controlled connections between the two said cylinders and a remote source of hydraulic pressure for driving the rack in either direction, selectively, to responsively open or close said ball-valve, adjusting means capable of a precision setting being provided to establish for the rack a limit to which the same may travel in the valve-opening movement thereof.

References Cited in the file of this patent

UNITED STATES PATENTS

| | | |
|---|---|---|
| 716,856 | Blesch | Dec. 30, 1902 |
| 1,134,904 | Piper | Apr. 6, 1915 |
| 1,797,591 | Sartakoff | Mar. 24, 1931 |
| 1,945,680 | Fahrenkamp | Feb. 6, 1934 |
| 2,081,510 | Smart | May 25, 1937 |
| 2,785,755 | En Dean | Mar. 19, 1957 |
| 2,929,606 | Kaiser | Mar. 22, 1960 |
| 2,930,575 | Britton | Mar. 29, 1960 |
| 2,974,921 | Kaswan | Mar. 14, 1961 |
| 2,983,479 | Thomas | May 9, 1961 |

FOREIGN PATENTS

| | | |
|---|---|---|
| 18,931 | Germany | 1882 |
| 417,424 | Great Britain | Oct. 4, 1934 |